(12) United States Patent
Akaike et al.

(10) Patent No.: US 10,150,391 B2
(45) Date of Patent: Dec. 11, 2018

(54) VEHICLE SEAT

(71) Applicant: TOYOTA BOSHOKU KABUSHIKI KAISHA, Aichi-ken (JP)

(72) Inventors: Fumitoshi Akaike, Miyoshi (JP); Koji Kaneda, Toyota (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/477,509

(22) Filed: Apr. 3, 2017

(65) Prior Publication Data

US 2017/0291511 A1 Oct. 12, 2017

(30) Foreign Application Priority Data

Apr. 8, 2016 (JP) ................................ 2016-077792

(51) Int. Cl.
| | |
|---|---|
| *B60N 2/42* | (2006.01) |
| *B60N 2/68* | (2006.01) |
| *B60N 2/427* | (2006.01) |
| *B60R 22/34* | (2006.01) |
| *B60R 22/26* | (2006.01) |
| *B60R 21/01* | (2006.01) |

(52) U.S. Cl.
CPC ........... *B60N 2/427* (2013.01); *B60N 2/4221* (2013.01); *B60N 2/4228* (2013.01); *B60N 2/68* (2013.01); *B60R 22/26* (2013.01); *B60R 22/34* (2013.01); *B60R 2021/01252* (2013.01)

(58) Field of Classification Search
CPC .. B60N 2/4221; B60N 2/4228; B60N 2/4279; B60N 2/68
See application file for complete search history.

(56) References Cited

U.S. PATENT DOCUMENTS

| | | | | | |
|---|---|---|---|---|---|
| 6,022,074 | A | * | 2/2000 | Swedenklef | B60N 2/2222 297/216.14 |
| 6,062,642 | A | * | 5/2000 | Sinnhuber | B60N 2/4228 297/216.1 |
| 6,076,887 | A | * | 6/2000 | Andersson | B60N 2/4235 297/216.1 |
| 6,568,753 | B1 | * | 5/2003 | Watanabe | B60N 2/42781 297/216.12 |
| 6,719,368 | B1 | * | 4/2004 | Neale | B60N 2/42727 297/216.14 |
| 9,415,713 | B2 | * | 8/2016 | Line | B60N 2/643 |

(Continued)

FOREIGN PATENT DOCUMENTS

JP   5-76860   10/1993

*Primary Examiner* — Timothy J Brindley (74) *Attorney, Agent, or Firm* — Greenblum & Bernstein, P.L.C.

(57) ABSTRACT

A vehicle seat including a controller configured to, in a case where an excessive external load in a front and rear direction, by which a first back frame part is configured to be pressed and bent toward a second back frame part, is applied to the first back frame part, adjust an inclination angle of each back frame part by driving and controlling a reclining adjuster so that the first back frame part can be pressed against the second back frame part by being bent due to the excessive external load, the first back frame part being one of a front back frame part and a rear back frame part of a seat back, and the second back frame part being another of the front back frame part and the rear back frame part.

7 Claims, 10 Drawing Sheets

(56) References Cited

U.S. PATENT DOCUMENTS

| | | | | |
|---|---|---|---|---|
| 9,809,131 B2* | 11/2017 | Line | | B60N 2/0232 |
| 9,914,378 B1* | 3/2018 | Line | | B60N 2/5825 |
| 2010/0066116 A1* | 3/2010 | Coenen | | B60N 2/4214 |
| | | | | 296/65.01 |
| 2010/0253122 A1* | 10/2010 | Okimoto | | A47C 1/023 |
| | | | | 297/330 |
| 2011/0057492 A1* | 3/2011 | Nakamura | | B60N 2/4228 |
| | | | | 297/301.4 |
| 2011/0221247 A1* | 9/2011 | Hashimoto | | B60N 2/0232 |
| | | | | 297/216.13 |
| 2011/0241403 A1* | 10/2011 | Yamaguchi | | B60N 2/4228 |
| | | | | 297/452.31 |
| 2014/0203603 A1* | 7/2014 | Line | | B60N 2/64 |
| | | | | 297/218.1 |
| 2015/0165937 A1* | 6/2015 | Harda | | B60N 2/4221 |
| | | | | 701/45 |
| 2015/0352986 A1* | 12/2015 | Fujita | | B60N 2/68 |
| | | | | 297/216.1 |
| 2015/0367762 A1* | 12/2015 | Yasuda | | B60N 2/42745 |
| | | | | 297/216.14 |
| 2016/0001677 A1* | 1/2016 | Stewart | | B60N 2/22 |
| | | | | 297/361.1 |
| 2016/0001689 A1* | 1/2016 | Yasuda | | B60N 2/80 |
| | | | | 297/391 |
| 2016/0009207 A1* | 1/2016 | Kuroda | | B60N 2/80 |
| | | | | 297/180.14 |
| 2016/0121761 A1* | 5/2016 | Nishide | | B60N 2/2222 |
| | | | | 297/284.3 |
| 2016/0304046 A1* | 10/2016 | McCoy | | B60N 2/4228 |
| 2017/0080833 A1* | 3/2017 | Dry | | B60N 2/914 |
| 2017/0096084 A1* | 4/2017 | Akaike | | B64D 11/0639 |
| 2017/0217341 A1* | 8/2017 | Kaneda | | B60N 2/99 |
| 2017/0267133 A1* | 9/2017 | Shimizu | | B60N 2/66 |
| 2017/0291511 A1* | 10/2017 | Akaike | | B60N 2/427 |
| 2017/0297460 A1* | 10/2017 | Akaike | | B60N 2/4492 |

* cited by examiner

VEHICLE SEAT

CROSS-REFERENCE TO RELATED APPLICATIONS

This application claims priority from Japanese Patent Application No. 2016-077792 filed on Apr. 8, 2016, the entire contents of which are incorporated herein by reference.

TECHNICAL FIELD

The disclosure relates to a vehicle seat. Specifically, the disclosure relates to a vehicle seat in which a seat back includes a front back frame part and a rear back frame part which are supported so that reclining thereof can be individually adjusted.

BACKGROUND

There is known a vehicle seat having a structure in which a seat back includes a top plate main part for supporting a body of a seated person from the rear side and a top plate side part for supporting the body of the seated person from both outer sides (JP-U-H05-076860). The seat back has a configuration in which the left and right top plate side parts form a continuous shell-like shape independent from the top plate main part and can be moved rearward with respect to the top plate main part when getting on and off the vehicle.

In the above technology, the support for the body of the seated person from the rear side is performed only by the top plate main part. Therefore, it is difficult to appropriately receive an excessive load received from the body of the seated person at the time of occurrence of a collision or the like of the vehicle. The disclosure has been made as a solution to the above problem and an object to be achieved by the disclosure is to make it possible to appropriately receive an excessive load applied to the seat back from the body of the seated person at the time of occurrence of a collision or the like of a vehicle.

SUMMARY

In order to achieve the above object, aspects of the disclosure provide a vehicle seat described hereinafter.

According to an aspect of the disclosure, there is provided a vehicle seat including: a seat back including a front back frame part and a rear back frame part which are supported so that reclining thereof can be individually adjusted; a reclining adjuster configured to support each of the front back frame part and the rear back frame part so that the reclining thereof can be individually adjusted; and a controller configured to, in a case where an excessive external load in a front and rear direction, by which a first back frame part is configured to be pressed and bent toward a second back frame part, is applied to the first back frame part, adjust an inclination angle of each back frame part by driving and controlling the reclining adjuster so that the first back frame part can be pressed against the second back frame part by being bent due to the excessive external load, the first back frame part being one of the front back frame part and the rear back frame part, and the second back frame part being another of the front back frame part and the rear back frame part.

Accordingly, in a case where the excessive external load in the front and rear direction is applied to the seat back, the inclination angle of each back frame part is adjusted by the controller. In this way, the first back frame part, to which the load is applied, is pressed against the second back frame part due to the bending so as to be able to be supported by the second back frame part. With this configuration, each back frame part can appropriately receive, in two stages, the excessive load applied to the seat back at the time of occurrence of a collision or the like of a vehicle.

DETAILED DESCRIPTION

Hereinafter, an embodiment of the disclosure will be described with reference to the drawings.

First Embodiment

Figure 1:
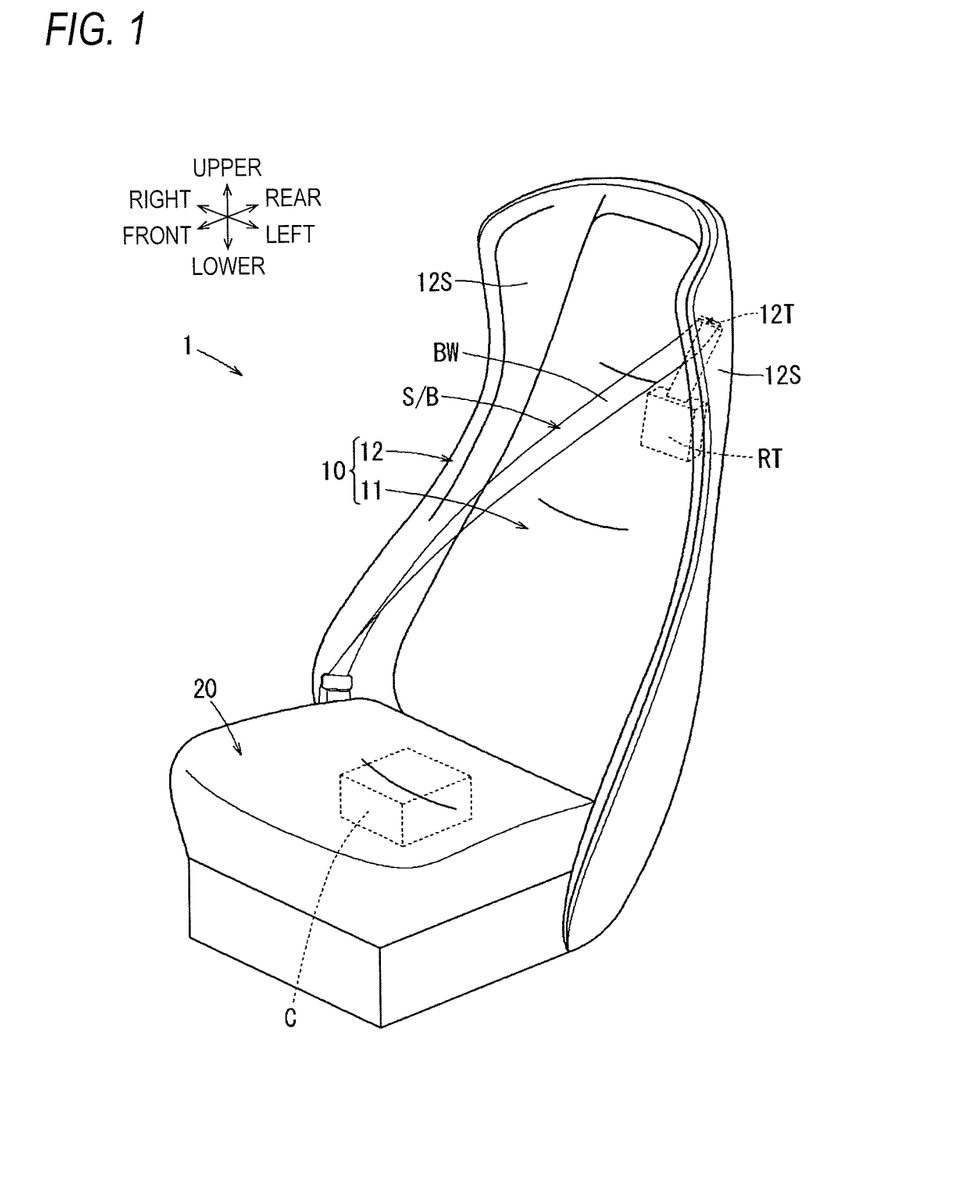
FIG. 1 is a perspective view showing a schematic configuration of a vehicle seat according to a first embodiment.

First, a configuration of a seat 1 (vehicle seat) according to a first embodiment will be described with reference to FIGS. 1 to 11. As shown in FIG. 1, the seat 1 of the present embodiment is configured as a left seat of an automobile and includes a seat back 10 serving as a backrest of a seated person and a seat cushion 20 serving as a seating part. The above-described seat back 10 is divided into a main back part 11 for supporting a body of a seated person from the rear side and a shell back part 12 located behind the main back part 11 and protruding in a shape curved forward at both outer sides so as to support the body of the seated person from both outer sides (both lateral sides).

Figure 2:
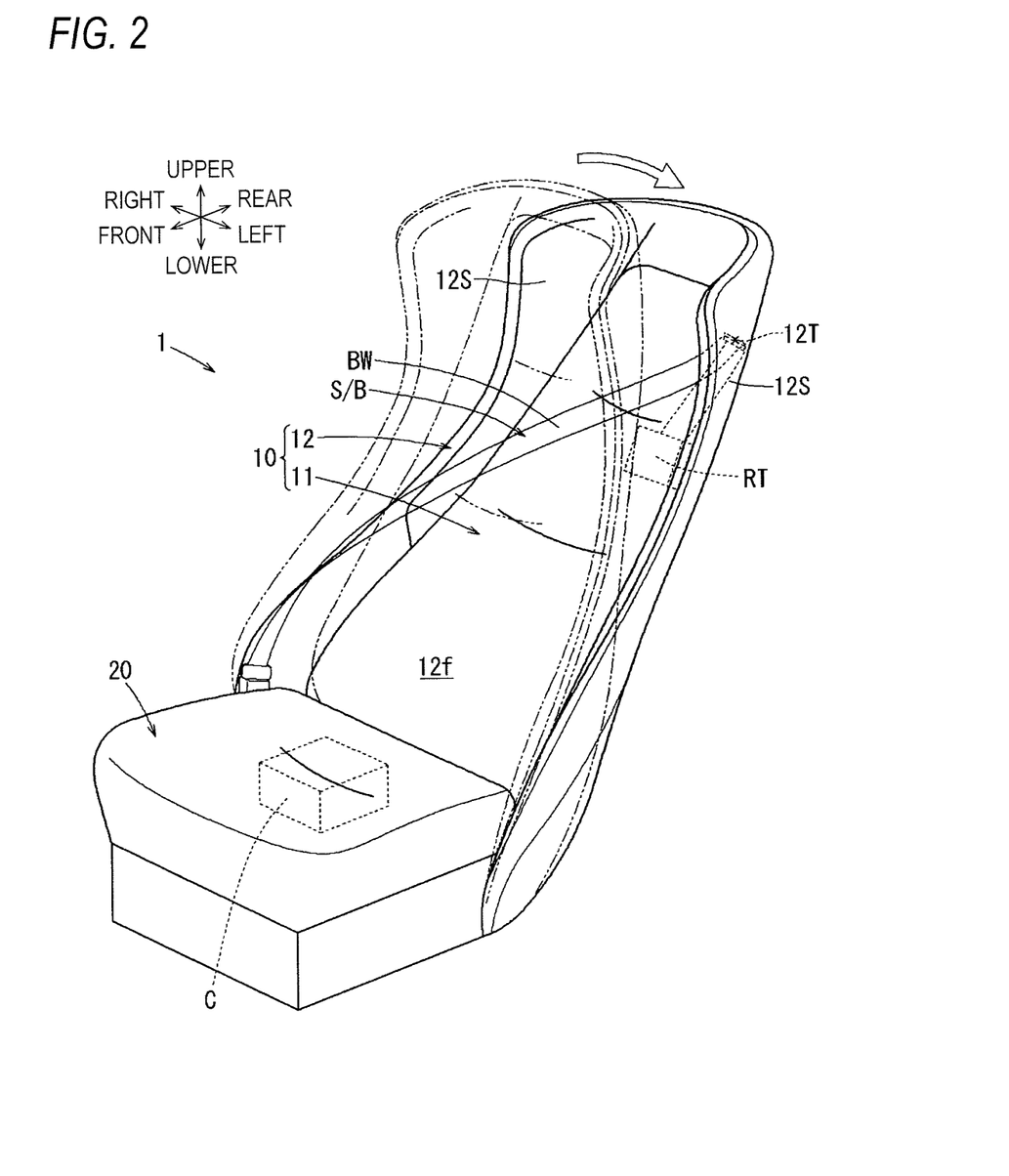
FIG. 2 is a perspective view showing a state in which a seat back is tilted rearward in a relaxed posture.
Figure 3:
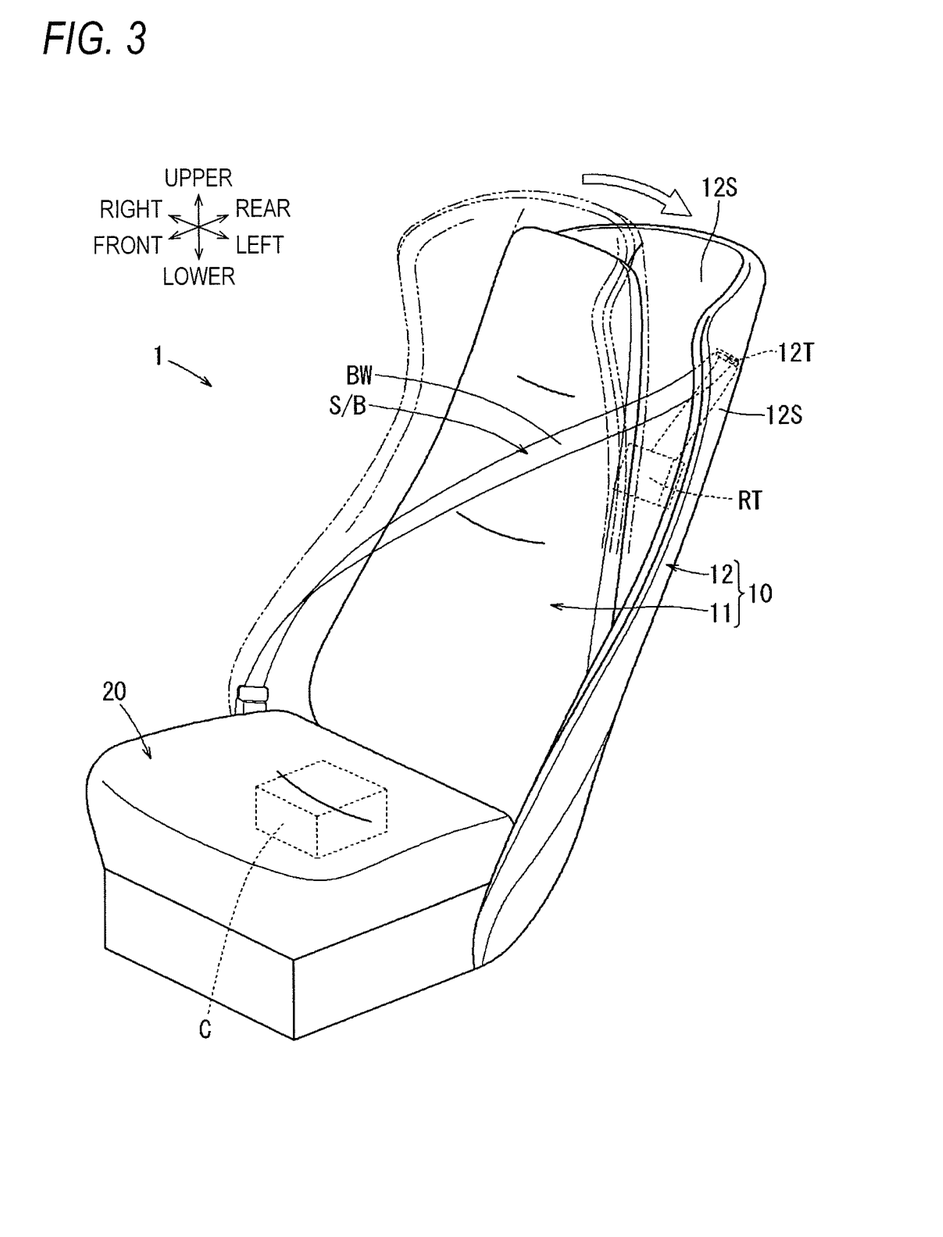
FIG. 3 is a perspective view showing a state in which a shell back part of the seat back is drawn away rearward from a main back part.

Each of the main back part 11 and the shell back part 12 described above supported so that the reclining thereof can be individually adjusted. With this configuration, as shown in FIGS. 1 and 2, the main back part 11 and the shell back part 12 can be tilted together in a front and rear direction in a state where they are superimposed on each other in the front and rear direction. On the other hand, as shown in FIG. 3, each of the main back part 11 and the shell back part 12 can be individually moved in the front and rear direction in a separated manner, so that the shell back part 12 can be, for example, retracted from the main back part 11.

As shown in FIGS. 1 and 2, the above-described shell back part 12 has a shape including side support portions 12S that supports the body of the seated person from both left and right outer sides by protruding forward from both left and right sides of the main back part 11 when the shell back part 12 is superimposed on the rear side of the main back part 11. As shown in FIG. 3, the above-described shell back part 12 is in an inclination angle in which it is retracted with respect to the main back part 11, so that the above-described side support portions 12S on the left and right sides are suppressed or prevented from protruding toward the front side with respect to the main back part 11.

As the shell back part 12 is retracted with respect to the main back part 11 as described above, the seated person can take a relaxed posture in which his arms can be pulled rearward. Particularly, as the shell back part 12 is pulled rearward from the relaxed posture in which the main back part 11 is tilted rearward, there is no feeling of cramping such as the feeling that the seated person's arms are pressed against the respective side support portions 12S and thus the width of the backrest is narrowed. Therefore, the seated person can feel freedom and take a relaxed posture, in which his arms can be spread to both outer sides or can be pulled rearward.

Figure 4:
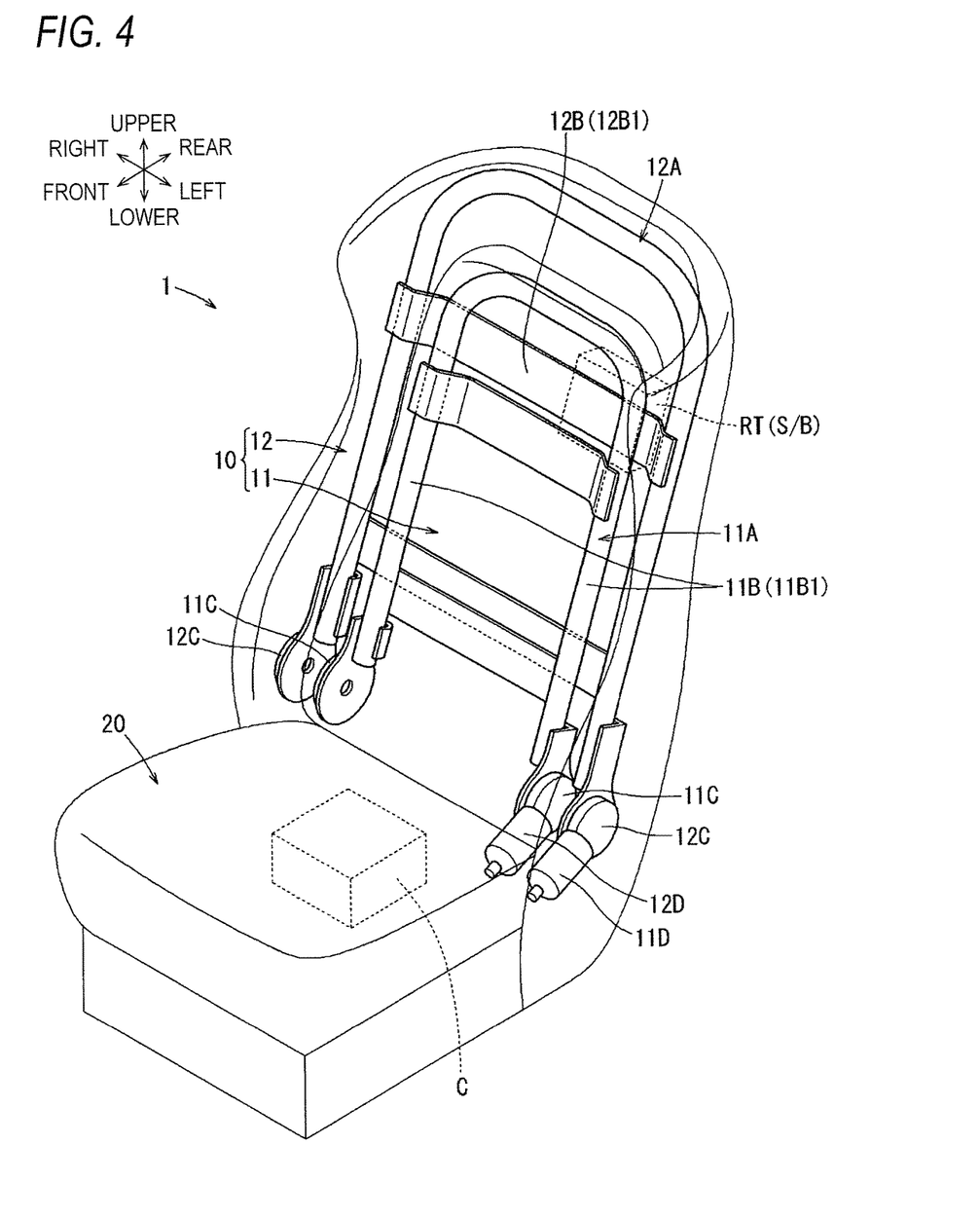
FIG. 4 is a perspective view showing a frame structure of the seat back.

As shown in FIG. 4, an internal framework of the above-described main back part 11 is configured by a main frame part 11A that is assembled in a substantially inverted U shape. The main frame part 11A is configured as a frame member forming a main framework along an outer peripheral portion such as both side portions and an upper portion of the main back part 11. Further, the main frame part 11A is configured such that the lower end portions on both left and right sides thereof are connected to the rear end portions on both left and right sides of the seat cushion 20 through an electric-type main back recliner 11C, respectively. Here, the main frame part 11A corresponds to the "front back frame part" of the disclosure, and each of the main back recliners 11C corresponds to the "reclining adjuster" of the disclosure, respectively.

With the above configuration, the rotation of the main frame part 11A is prevented by the main back recliners 11C in a normal state where the driving of each main back recliner 11C is stopped. Thus, the main frame part 11A is held in a state where an angular posture thereof with respect to the seat cushion 20 is fixed at a fixed position. Further, as each main back recliner 11C described above is driven in each of the forward and reverse directions, the angular posture of the main frame part 11A with respect to the seat cushion 20 is changed to each of the front and rear directions corresponding to the operating direction. Each main back recliner 11C described above is configured so that it is driven by receiving a driving force transmitted from a main back motor 11D connected to the main back recliners 11C or the driving thereof is stopped by a braking force due to the driving stop of the main back motor 11D.

Further, an internal framework of the shell back part 12 is configured by a shell frame part 12A that is assembled in a substantially inverted U shape. The shell frame part 12A is configured as a frame member forming a main framework along an outer peripheral portion such as both side portions and an upper portion of the shell back part 12. Further, the shell frame part 12A is configured such that the lower end portions on both left and right sides thereof are connected to the rear end portions on both left and right sides of the seat cushion 20 through an electric-type shell back recliner 12C, respectively. Here, the shell frame part 12A corresponds to the "rear back frame part" of the disclosure, and each of the shell back recliners 12C corresponds to the "reclining adjuster" of the disclosure, respectively.

With the above configuration, the rotation of the shell frame part 12A is prevented by these shell back recliners 12C in a normal state where the driving of each shell back recliner 12C described above is stopped. Thus, the shell frame part 12A is held in a state where an angular posture thereof with respect to the seat cushion 20 is fixed at a fixed position. Further, as each shell back recliner 12C described above is driven in each of the forward and reverse directions, the angular posture of the shell frame part 12A with respect to the seat cushion 20 is changed to each of the front and rear directions corresponding to the driving direction. Each shell back recliner 12C described above is configured so that it is driven by receiving a driving force transmitted from a shell back motor 12D connected to the shell back recliners 12C or the driving thereof is stopped by a braking force due to the driving stop of the shell back motor 12D.

A plate-like bridging plate 12B is provided so as to be integrally bridged between both frame sides of the U-shaped portion of the above-described shell frame part 12A. The bridging plate 12B is provided so as to laterally extend across a region on the rear side in the vicinity of the upper end side of both side frames 11B of the U-shaped portion of the main frame part 11A. With the above configuration, as the shell frame part 12A moves to approach the main frame part 11A from the rear side, the above-described bridging plate 12B comes into contact with the both side frames 11B of the main frame part 11A from the rear side, and thus, the movement thereof is locked.

Figure 11:
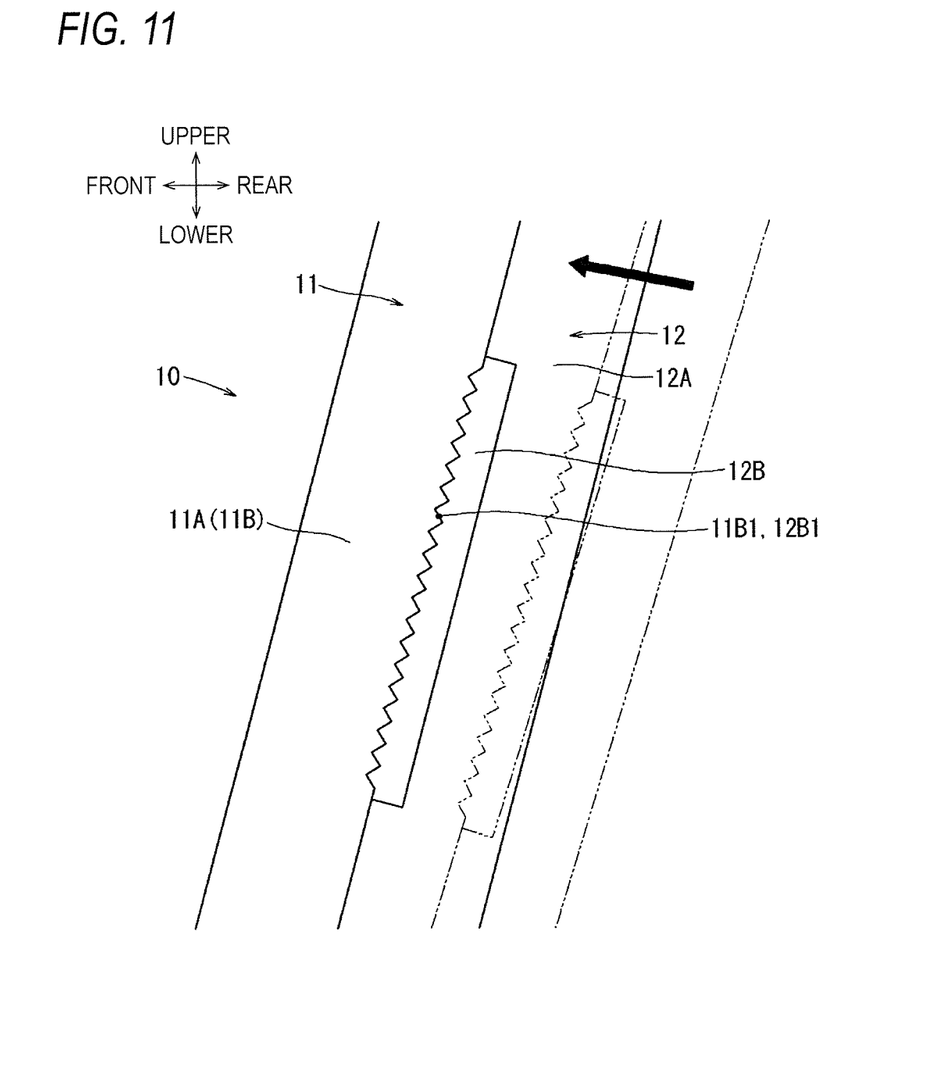
FIG. 11 is an enlarged view showing a meshing structure provided between contact portions of the main back part and the shell back part.

As shown in FIG. 11, meshing teeth 12B1, 11B1 are formed at each of contact portions between the above-described bridging plate 12B and each side frame 11B to be pressed against each other. The meshing teeth 12B1, 11B1 are meshed with each other by being pressed against each other in the front and rear direction. Each of these meshing teeth 12B1, 11B1 has a shape in which a plurality of teeth is arranged in a height direction. The meshing teeth 12B1, 11B1 are meshed with each other, thereby restricting the relative movement between the bridging plate 12B and each side frame 11B in the height direction. With the above configuration, in the state where the shell frame part 12A and the main frame part 11A are pressed against and meshed with each other in the front and rear direction, they can take an integral state in which slippage in the height direction therebetween does not occur. Here, a combination of the meshing teeth 12B1, 11B1 described above corresponds to the "engaging structures" of the disclosure.

As shown in FIG. 4, a retractor RT of a seat belt device S/B to be attached to a seated person of the seat 1 is also attached to the bridging plate 12B. As shown in FIG. 1, the seat belt device S/B is attached to the body of the seated person in such a way that a belt webbing BW released from the above-described retractor RT passes through the inside of the shell back part 12 and is pulled out to the front region of the main back part 11 from a belt passage hole 12T formed at a left shoulder of the shell back part 12.

With the above configuration, when the front collision of the vehicle occurs, the body of the seated person is pressed against the belt webbing BW, and thus, the shell back part 12 receives an excessive external load. Thereby, the shell back part 12 is subjected to a force for strongly pushing and bending its upper region to which the retractor RT is attached toward the front side with, as a fulcrum, a fixed portion set by each shell back recliner 12C on the lower end side, like bending in a cantilever support beam. Further, when the rear collision of the vehicle occurs, the main back part 11 receives an excessive external load due to the pushing of the body of the seated person from the front side. Thereby, the main back part 11 is subjected to a force for strongly pushing and bending it toward the rear side with, as a fulcrum, a fixed portion set by each main back recliner 11C on the lower end side, like bending in a cantilever support beam. Here, each main back recliner 11C and each shell back recliner 12C described above are respectively arranged coaxially with each other and around an axis in a seat width direction so as to be able to adjust the reclining of the main back part 11 and the shell back part 12 in the front and rear direction.

In this way, the seat back 10 is configured to receive a force such that the rear shell back part 12 at the front side is strongly pressed and bent toward the main back part 11 at the front side, or receive a force such that the main back part 11 at the front side is strongly pressed and bent toward the shell back part 12 at the rear side due to the occurrence of the front or rear collision of the vehicle. However, even when an excessive external load in the front and rear direction is applied to the main back part 11 or the shell back part 12 described above, the seat back 10 is configured such that one of the main back part 11 or the shell back part 12, which receives the load, is pressed against the other of the main back part 11 or the shell back part 12 to be supported from the backside by the movement control by a controller C to be described later. In this way, it is possible to appropriately receive the load in two stages.

Figure 8:
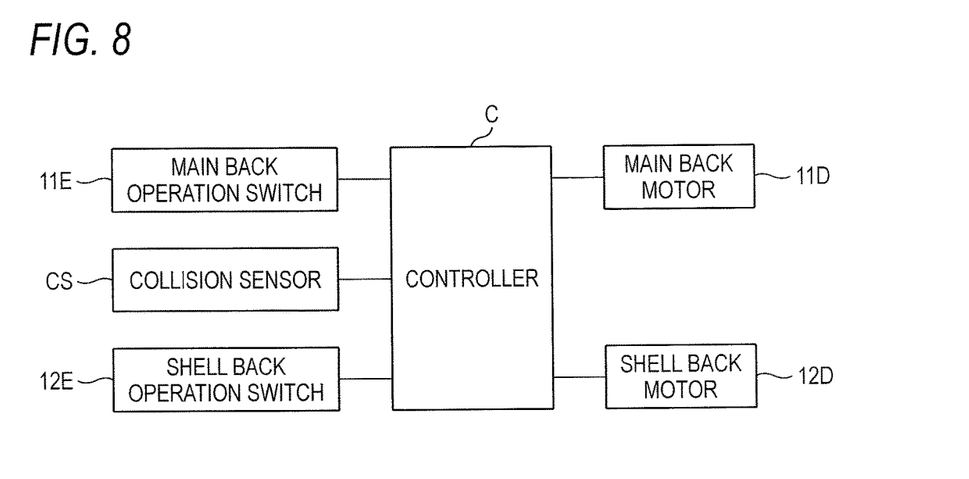
FIG. 8 is a block diagram of a system for adjusting an inclination angle of the seat back.

Specifically, as shown in FIG. 8, the above-described controller C is connected to a main back operation switch 11E for performing an ON/OFF switching operation of the driving of the main back motor 11D and a shell back operation switch 12E for performing an ON/OFF switching operation of the driving of the shell back motor 12D. The controller C drives and controls the main back motor 11D and the shell back motor 12D based on the operations instructions from these operation switches. At that time, the controller C can detect the rotational positions of the main back motor 11D and the shell back motor 12D based on the number of pulse signals. In this way, the controller C can detect inclination angles of the main back part 11 and the shell back part 12 whose angles are adjusted by the driving operation of each main back recliner 11C and each shell back recliner 12C. Although a specific illustration is omitted, the main back operation switch 11E and the shell back operation switch 12E described above are provided at predetermined portions of the seat 1, such as a side portion of the seat cushion 20 described with reference to FIG. 1.

Figure 5:
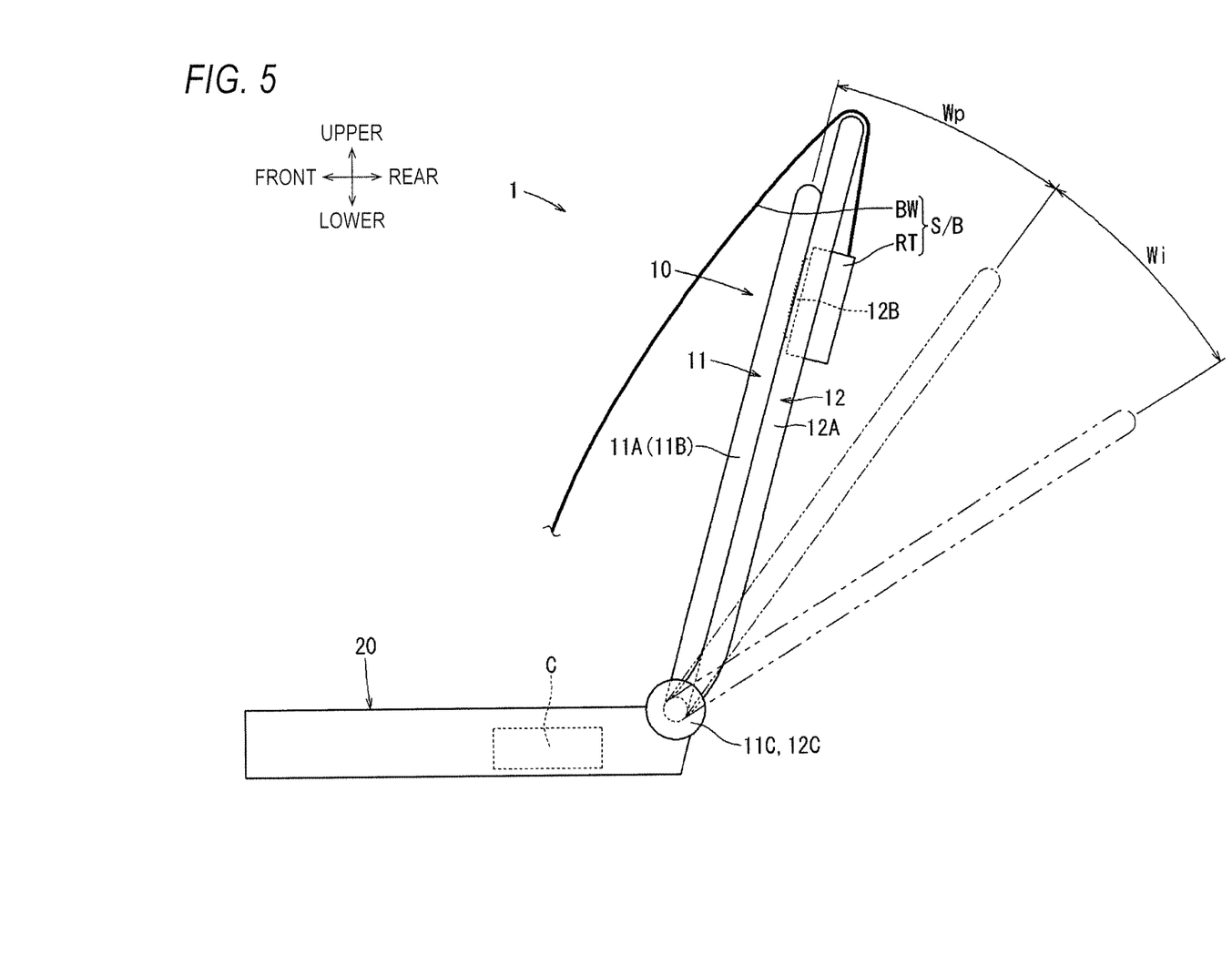
FIG. 5 is a side view showing an appropriate range and an inappropriate range for the load receiving of the seat back.

Further, as shown in FIG. 8, the above-described controller C is also connected to a collision sensor CS that is mounted on a vehicle. The collision sensor CS detects in advance the occurrence of the front or rear collision of the vehicle. The controller receives an input signal from the collision sensor CS. Based on the input signal from the collision sensor CS, the controller C determines a timing when an excessive external load due to the occurrence of the collision will be applied to the main back part 11 or the shell back part 12, and drives and controls the main back motor 11D or the shell back motor 12D. Specifically, as shown in FIG. 5, in a case where it is determined that an excessive external load due to the occurrence of the collision is applied to the main back part 11 or the shell back part 12, the above-described controller C first performs an angle correction so as to move the main back part 11 into the appropriate range Wp suitable for receiving the load when the main back part H is in the inappropriate range Wi out of the appropriate range Wp.

Here, the above-described appropriate range Wp is set as an angle range in which the body of the seated person rests in a normal seated posture, i.e., an angle range which is almost upright but is tilted rearward. Further, the inappropriate range Wi is set as a range out of the appropriate range Wp. Here, the above-described appropriate range corresponds to the "predetermined angle range suitable for receiving the load" of the disclosure.

Figure 6:
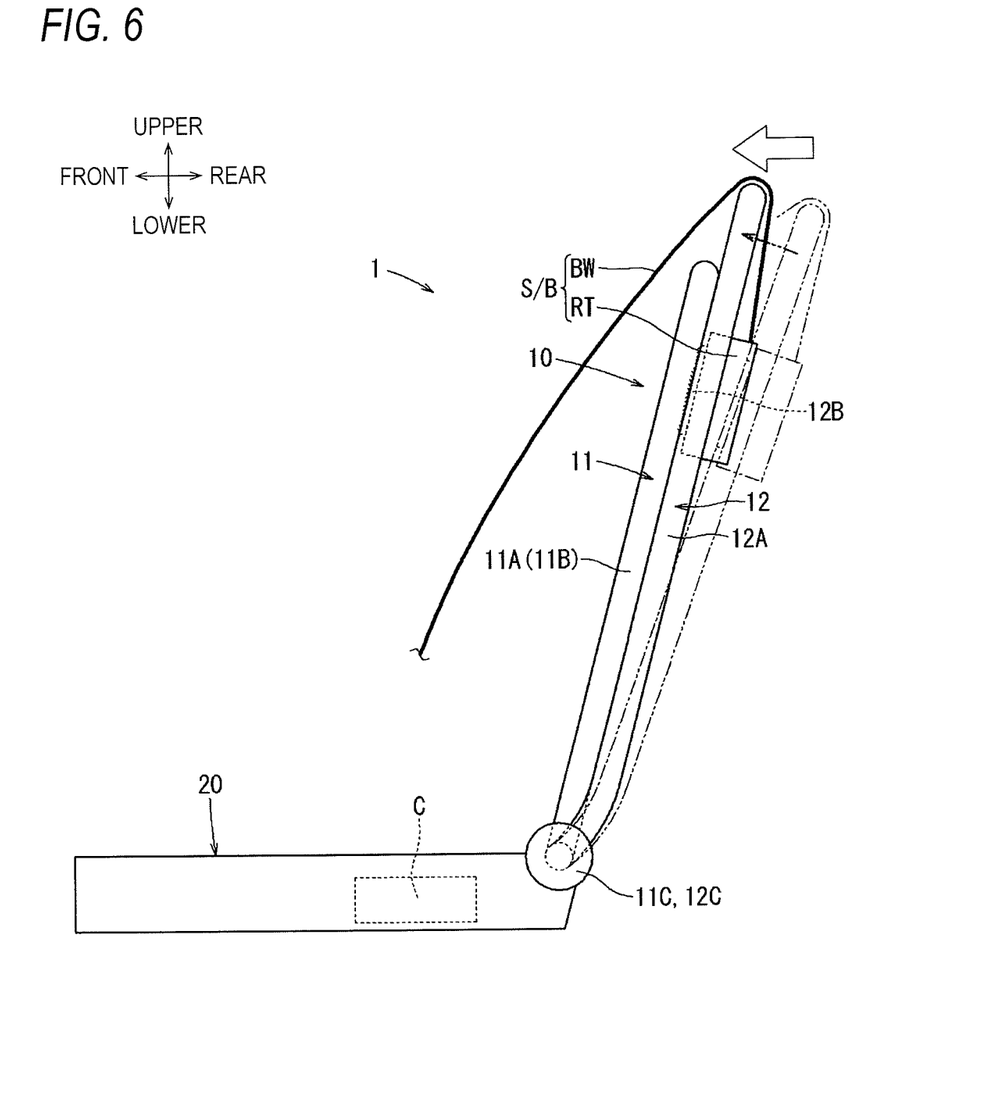
FIG. 6 is a side view showing a state in which an angle of the seat back is adjusted in accordance with the detection of a front collision of a vehicle.
Figure 9:
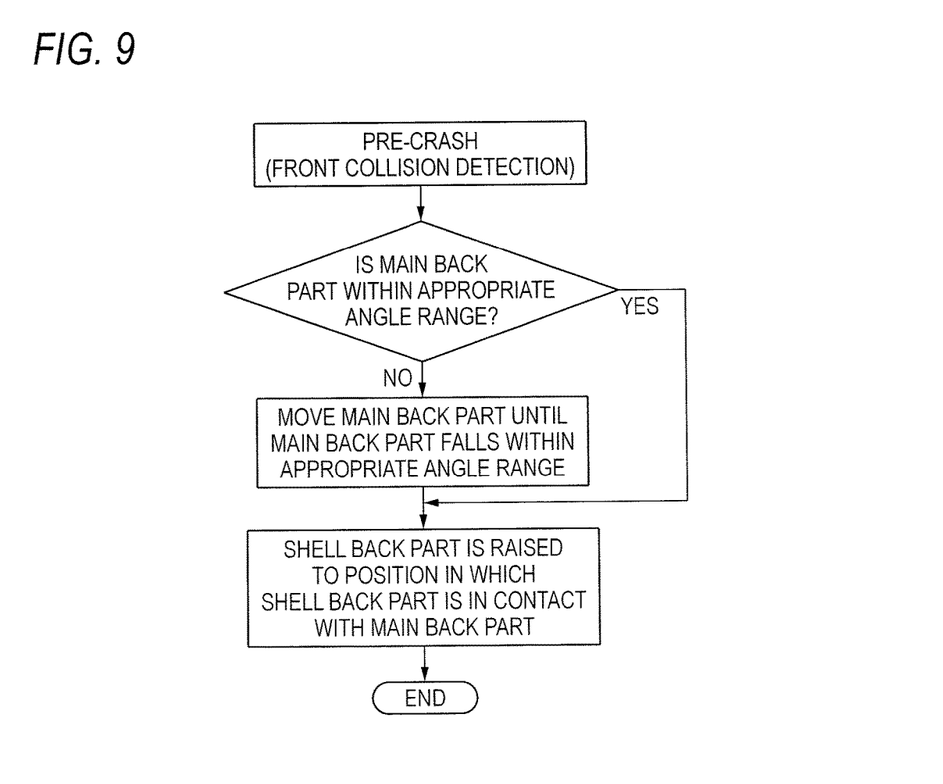
FIG. 9 is a flowchart showing a flow in which the angle of the seat back is adjusted in accordance with the detection of the front collision of the vehicle.

Further, after performing the angle correction, in a case where the collision detection is detection of the front collision of the vehicle, as shown in FIG. 6, the controller C drives and controls the shell back part 12, which receives the forward load due to the occurrence of the front collision, such that the shell back part 12 is adjusted to a rear load receiving inclination angle, in which the shell back part 12 comes into contact with the main back part 11 at the front side from the rear side (see FIG. 9). Since this drive control has been performed, an excessive external load applied to the shell back part 12 so as to push and bend the shell back part 12 toward the front side is also received by the main back part 11. In this way, it is possible to appropriately receive the external load in two stages by both parts.

Figure 7:
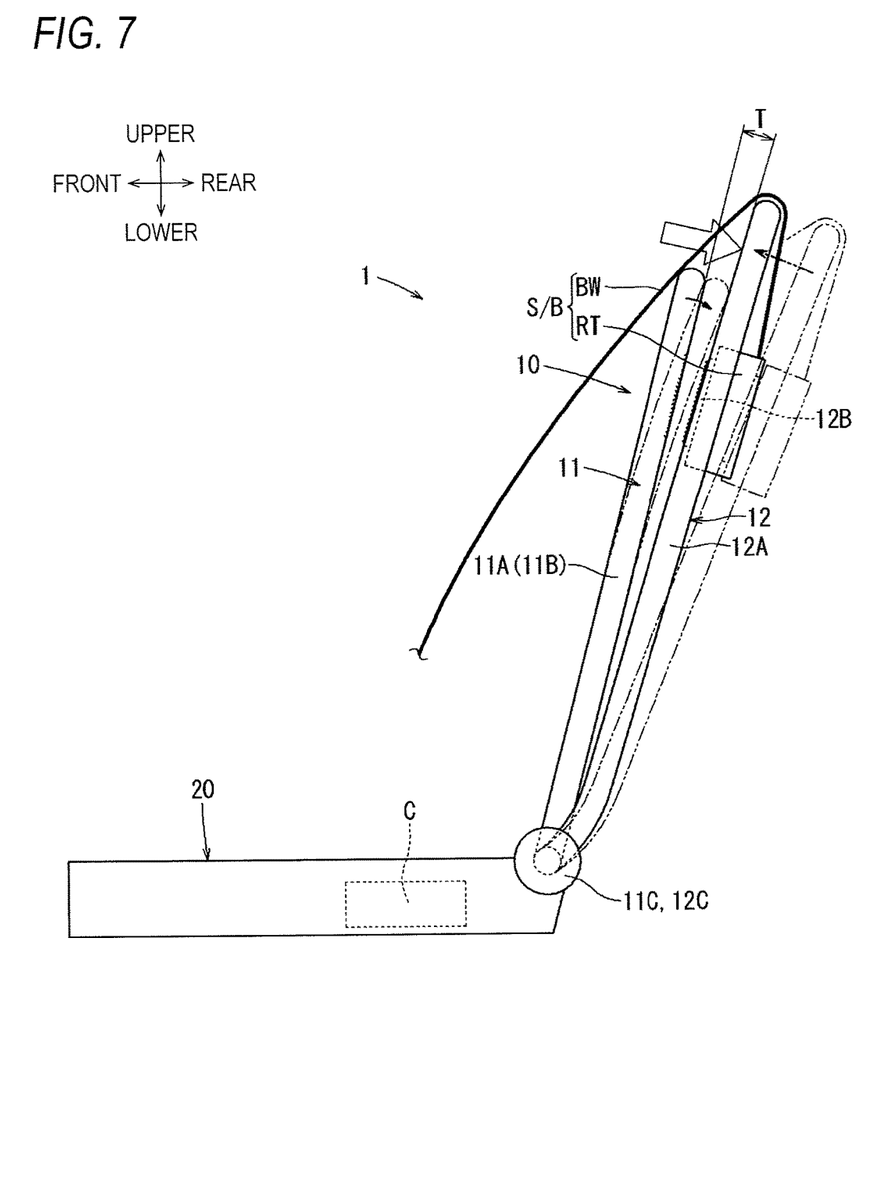
FIG. 7 is a side view showing a state in which the angle of the seat back is adjusted in accordance with the detection of a rear collision of a vehicle.
Figure 10:
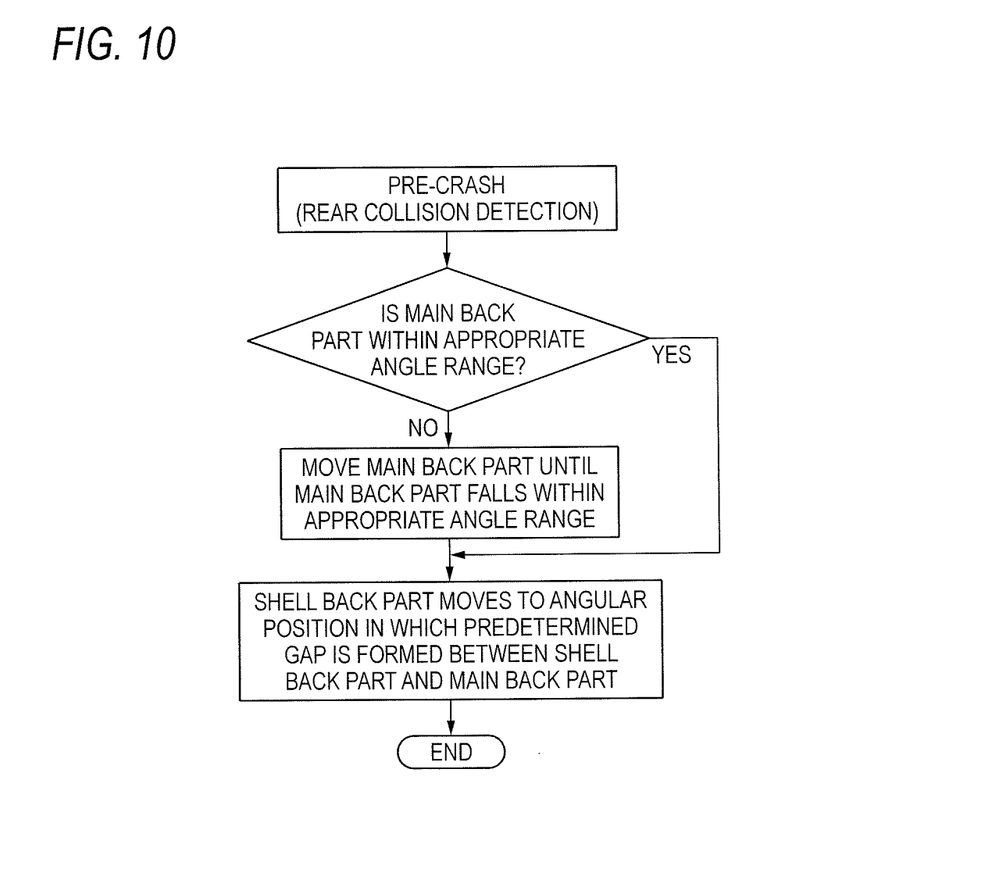
FIG. 10 is a flowchart showing a flow in which the angle of the seat back is adjusted in accordance with the detection of the rear collision of the vehicle.

On the other hand, when the collision detection is detection of the rear collision of the vehicle, as shown in FIG. 7, the controller C drives and controls the main back part 11, which receives the rearward load due to the occurrence of the rear collision, such that the shell back part 12 at the rear side is adjusted to a front load receiving inclination angle, in which the shell back part 12 is close to a state where there is a predetermined gap T between the rear side of the main back part 11 (see FIG. 10). Since this drive control has been performed, in a case where an excessive external load that presses and bends the shell back part 12 toward the rear side is applied to the main back part 11, the main back part 11 is pushed and bent until the predetermine gap T between the main back part 11 and the shell back part 12 is eliminated. In this way, the main back part 11 comes into contact with the shell back part 12 by absorbing the energy by the bending. As a result, it is possible to appropriately receive the external load in two stages by both parts.

In either case shown in FIGS. 6 and 7, as the meshing teeth 11B1, 12B1 (see FIG. 11) formed in the contact portions between each side frame 11B and the bridging plate 12B to be pressed against each other in the front and rear direction are meshed with each other, the main back part 11 and the shell back part 12 are strongly integrated with each other so as not to cause slippage therebetween in the height direction. In this way the external load applied between the main back part 11 and the shell back part 12 can be firmly received in two stages.

In summary, the seat 1 of the present embodiment has the following configurations. That is, the vehicle seat (seat 1) includes a seat back (seat back 10) including a front back frame part (main frame part 11A) and a rear back frame part (shell frame part 12A) which are supported so that reclining thereof be individually adjusted. The vehicle seat (seat 1) includes a reclining adjuster (main back recliner 11C and shell back recliner 12C) configured to support each of the front back frame part (main frame part 11A) and the rear back frame part (shell frame part 12A) so that the reclining thereof can be individually adjusted, and a controller (controller C) configured to, in a case where an excessive external load in a front and rear direction, by which a first back frame part (main frame part 11A (shell frame part 12A)) is configured to be pressed and bent toward a second back frame part (shell frame part 12A (main frame part 11A)) is applied to the first back frame part (main frame part 11A (shell frame part 12A)), adjust an inclination angle of each back frame part (main frame part 11A and shell frame part 12A) by driving and controlling the reclining adjuster (main back recliner 11C and shell back recliner 12C) so that the first back frame part (main frame part 11A (shell frame part 12A)) can be pressed against the second back frame part (shell frame part 12A (main frame part 11A)) by being bent due to the excessive external load, the first back frame part (main frame part 11A (shell frame part 12A)) being one of the front back frame part (main frame part 11A) and the rear back frame part (shell frame part 12A), and the second back frame part (shell frame part 12A (main frame part 11A)) being another of the front back frame part (main frame part 11A) and the rear back frame part (shell frame part 12A).

By adopting such a configuration, in a case where the excessive external load in the front and rear direction is applied to the seat back (seat back 10), the inclination angle of each back frame part (main frame part 11A and shell frame part 12A) is adjusted by the controller (controller C). In this way, the first back frame part (main frame part 11A (shell frame part 12A)), to which the load is applied, is pressed against the second frame part (shell frame part 12A (main frame part 11A)) due to the bending so as to be able to be supported by the second back frame part (shell frame part 12A (main frame part 11A)). With this configuration, each back frame part (main frame part 11A and shell frame part 12A) can appropriately receive, in two stages, the excessive load applied to the seat back (seat back 10) at the time of occurrence of a collision or the like of a vehicle.

Further, the first back frame part may be the front back frame part (main frame part 11A) and the second back frame part may be the rear back frame part (shell frame part 12A). In this case, in a case where the excessive external load that presses and bends the front back frame part (main frame part 11A) toward the rear side is applied to the front back frame part (main frame part 11A), the controller (controller C) is configured to adjust each back frame part (main frame part 11A and shell frame part 12A) to a front load receiving inclination angle at which a predetermined gap (predetermined gap T) in the front and rear direction is formed between the front back frame part (main frame part 11A) and the rear back frame part (shell frame part 12A). By adopting such a configuration, in a case where the excessive external load that presses and bends the front back frame part (main frame part 11A) toward the rear side is applied from the body of the seated person to the front back frame part (main frame part 11A) at the time of occurrence of a rear collision or the like of a vehicle, the front back frame part (main frame part 11A) can be bent within the predetermined gap (predetermined gap T) formed between the front back frame part (main frame part 11A) and the rear back frame part (shell frame part 12A). Therefore, the external load can be appropriately received by absorbing energy by the bending.

Further, the first back frame part may be the rear back frame part (shell frame part 12A) and the second back frame part may be the front back frame part (main frame part 11A). In this case, a retractor (retractor RT) of a seat belt device (seat belt device S/B) configured to be fastened to a body of a seated person is equipped on the rear back frame part (shell frame part 12A). In a case where an excessive external load that presses and bends the rear back frame part (shell frame part 12A) toward the front side is applied to the rear back frame part (shell frame part 12A) from the body of the seated person through the retractor (retractor RT), the controller (controller C) is configured to adjust each back frame part (main frame part 11A and shell frame part 12A) to a rear load receiving inclination angle in which the front back frame part (main frame part 11A) and the rear back frame part (shell frame part 12A) are in contact with each other in the front and rear direction. By adopting such a configuration, in a case where the excessive external load that presses and bends the rear back frame part (shell frame part 12A) toward the front side is applied from the body of the seated person to the rear back frame part (shell frame part 12A) through the retractor (retractor RT) at the time of occurrence of a front collision or the like of a vehicle, since the rear back frame part (shell frame part 12A) can be immediately brought into contact with the front back frame part (main frame part 11A) without any gap, the external load can be appropriately received.

Further, in the case where an excessive external load in the front and rear direction, by which the first back frame part (main frame part 11A (shell frame part 12A)) is configured to be pressed and bent toward the second back frame part (shell frame part 12A (main frame part 11A)), is applied to the first back frame part (main frame part 11A (shell frame part 12A)), when an inclination angle (inappropriate range Wi) of at least one of the first back frame part and the second back frame part (main frame part 11A and shell frame part 12A) is out of a predetermined angle range (appropriate range Wp) suitable for receiving the load, the controller (controller C) is configured to correct the inclination angle of at least one back frame part (at least one of main frame part 11A and shell frame part 12A) to fall within the predetermined angle range (appropriate range Wp) suitable for receiving the load. By adopting such a configuration, even when the seat back (seat back 10) is in an angular posture (inappropriate range Wi) that is not suitable for receiving load, such as when the seat back (seat back 10) is utilized in a relaxed posture where it is tilted, each back frame part (main frame part 11A and shell frame part 12A) can be corrected to an inclination angle within the predetermined angle range (appropriate range Wp) suitable for receiving the load when the excessive external load in the front and rear direction is applied to the seat back (seat back 10), thereby appropriately receiving the external load.

Further, an engaging structure (meshing teeth 11B1, 12B1) is provided between a first contact portion of the first back frame part and a second contact portion of the second back frame part which are pressed against each other, the engaging structure causing the first contact portion and the second contact portion to be engaged with each other in a state where a positional deviation therebetween in a height direction is restricted due to mutual contact therebetween. By adopting such a configuration, the positional deviation in the height direction between the back frame parts (main frame part 11A and shell frame part 12A) is restricted when the back frame parts (main frame part 11A and shell frame part 12A) are pressed against each other. Therefore, the external load applied to the first back frame part (main frame part 11A (shell frame part 12A)) can be more firmly received between the first back frame part and the second back frame part (shell frame part 12A (main frame part 11A)).

Although the embodiments of the disclosure have been described above based on one embodiment, the disclosure can be implemented in various forms other than the above embodiment. For example, the configuration according to the vehicle seat of the disclosure can be applied to a seat of an automobile other than a left seat, and can also be widely applied to a seat of a vehicle other than an automobile, such as a train, an aircraft, and a ship.

Further, the front and rear back frame parts may be configured so that the reclining thereof can be adjusted around different central axes by the reclining adjuster. The reclining adjuster may be configured to adjust the reclining of the two front and rear back frame parts by a motion other than a single axis rotation, such as a slide motion or a link motion. Further, the engaging structures provided between the contact portions of the back frame parts to be pressed against each other may have a configuration in which concavities and convexities are simply fitted to each other, in addition to the combination of the meshing teeth. The shapes of the concavities and convexities are not limited to the teeth shape, but may be made of combinations of concavities and convexities having a cylinder shape or a curved surface shape. Further, the engaging structures may be engaged in a state where a positional deviation in the height direction is restricted by viscous resistance or frictional resistance due to the mutual contact.

Further, in a case where an excessive external load that presses and bends the front back frame part toward the rear side is applied to the front back frame part, the controller may be configured to adjust each back frame part to an inclination angle in which the back frame parts are in contact with each other in the front and rear direction. By adopting such a configuration, the front back frame part can be immediately brought into contact with the rear back frame part without any gap, thereby appropriately receiving the external load. Further, when an excessive external load that presses and bends the rear back frame part toward the front side is applied to the rear back frame part, the controller may be configured to adjust each back frame part to an inclination angle in which a predetermined gap in the front and rear direction is formed between the back frame parts. By adopting such a configuration, the rear back frame part can be bent within a predetermined gap formed between the front back frame part and the rear back frame part. In this way, the external load can be appropriately received by absorbing the energy.

What is claimed is:

1. A vehicle seat comprising:
   a seat back including a front back frame part and a rear back frame part which are supported so that reclining thereof can be individually adjusted;
   a reclining adjuster configured to support each of the front back frame part and the rear back frame part so that the reclining thereof can be individually adjusted; and
   a controller configured to adjust an inclination angle of each back frame part in a case where an excessive external load in a front and rear direction is applied to the first back frame part, by driving and controlling the reclining adjuster so that a first back frame part is pressable against a second back frame part by being bent due to the excessive external load, wherein the first back frame part is one of the front back frame part and the rear back frame part, and the second back frame part is another of the front back frame part and the rear back frame part.

2. The vehicle seat according to claim 1,
   wherein the first back frame part is the front back frame part and the second back frame part is the rear back frame part, and
   wherein, in a case where the excessive external load that presses and bends the front back frame part toward the rear side is applied to the front back frame part, the controller is configured to adjust each back frame part to a front load receiving inclination angle at which a predetermined gap in the front and rear direction is formed between the front back frame part and the rear back frame part.

3. The vehicle seat according to claim 1,
   wherein the first back frame part is the rear back frame part and the second back frame part is the front back frame part,
   wherein a retractor of a seat belt device configured to be fastened to a body of a seated person is equipped on the rear back frame part, and
   wherein, in a case where the excessive external load that presses and bends the rear back frame part toward the front side is applied to the rear back frame part from the body of the seated person through the retractor, the controller is configured to adjust each back frame part to a rear load receiving inclination angle in which the front back frame part and the rear back frame part are in contact with each other in the front and rear direction.

4. The vehicle seat according to claim 1,
   wherein, in the case where the excessive external load in the front and rear direction, by which the first back frame part is configured to be pressed and bent toward the second back frame part, is applied to the first back frame part, when an inclination angle of at least one of the first back frame part and the second back frame part is out of a predetermined angle range suitable for receiving the load, the controller is configured to correct the inclination angle of the at least one back frame part to fall within the predetermined angle range suitable for receiving the load.

5. The vehicle seat according to claim 1,
   wherein an engaging structure is provided between a first contact portion of the first back frame part and a second contact portion of the second back frame part which are pressed against each other, the engaging structure causing the first contact portion and the second contact portion to be engaged with each other in a state where a positional deviation therebetween in a height direction is restricted due to mutual contact therebetween.

6. The vehicle seat according to claim 1,
   wherein the controller receives a signal from a sensor, and determines a timing when the excessive external load is applied to the first back frame part based on the signal from the sensor.

7. The vehicle seat according to claim 1,
   wherein the front back frame part and the rear back frame part rotate about a same axis.

* * * * *